US012654090B2

(12) United States Patent
Jung

(10) Patent No.: US 12,654,090 B2
(45) Date of Patent: Jun. 16, 2026

(54) GOLF PUTTING DATA MEASUREMENT DEVICE

(71) Applicant: SPORTSWAVE INC., Seoul (KR)

(72) Inventor: Sang Won Jung, Korea (KR)

( * ) Notice: Subject to any disclaimer, the term of this patent is extended or adjusted under 35 U.S.C. 154(b) by 0 days.

(21) Appl. No.: 18/950,162

(22) Filed: Nov. 17, 2024

(65) Prior Publication Data

US 2026/0131217 A1 May 14, 2026

(30) Foreign Application Priority Data

Nov. 14, 2024 (KR) .......................... 10-2024-0162161

(51) Int. Cl.
| | |
|---|---|
| *A63B 71/06* | (2006.01) |
| *A63B 57/00* | (2015.01) |
| *G01S 7/481* | (2006.01) |
| *G01S 17/10* | (2020.01) |

(52) U.S. Cl.
CPC .......... *A63B 71/0622* (2013.01); *A63B 57/00* (2013.01); *G01S 7/4814* (2013.01); *G01S 17/10* (2013.01); *A63B 2220/20* (2013.01); *A63B 2220/805* (2013.01)

(58) Field of Classification Search
CPC . A63B 71/0622; A63B 57/00; A63B 2220/20; A63B 2220/805; G01S 7/4814
See application file for complete search history.

(56) References Cited

U.S. PATENT DOCUMENTS

2013/0085018 A1 * 4/2013 Jensen ................... A63F 13/812
473/404

OTHER PUBLICATIONS

Dotproduct, How To: Turn a Samsung / Android Phone Into a Handheld 3D Scanner, Aug. 11, 2021, Youtube.com, pp. 1-7, at (https://www.youtube.com/watch?v=A7RuKhO3zno, (last visited Sep. 10, 2025). (Year: 2021).*

* cited by examiner

*Primary Examiner* — Steve Rowland
(74) *Attorney, Agent, or Firm* — ANTONIO HA & U.S. PATENT, LLC

(57) ABSTRACT

An embodiment of the present disclosure relates to a golf putting data measurement device including: a body to be coupled to a smartphone; a laser light source installed in the body that irradiates laser light to point to a subject when a measurement button of the body is pushed; a lidar sensor installed in the body that senses a distance to the subject pointed by the laser light source using a laser pulse; and a controller that computes golf putting data from distance information to the subject measured by the lidar sensor and transmits the golf putting data to the smartphone, and causes a display of the smartphone to display the golf putting data.

11 Claims, 6 Drawing Sheets

(a)

(b)

GOLF PUTTING DATA MEASUREMENT DEVICE

CROSS REFERENCE TO RELATED APPLICATION

This application claims priority from Republic of Korea Patent Application No. 10-2024-0162161, filed on Nov. 14, 2024, which is hereby incorporated by reference in its entirety.

BACKGROUND

Field

The present disclosure relates to a golf putting data measurement device for measuring data needed for golf putting of a user.

Description of Related Art

Golf is a game where the number of strokes required to hit a golf ball stopped on a golf course with a golf club and put the golf ball into a hole cup is calculated to compete for superiority. A golf player uses various types of golf clubs to hit a golf ball concurrently with drive shots, iron shots, bunker shots, and putting to make the golf ball go into the hole cup on the green.

Putting is the final finishing stage of a golf game, and is about putting a golf ball into a hole cup mainly from a close distance to the hole cup. In order to make an accurate putt, a golfer needs to accurately grasp information such as the slope around the hole cup on the green and hit the golf ball with the appropriate force and direction.

However, it is very difficult for a golfer or caddie to accurately grasp the overall information such as the slope around the location of the hole cup by observing the actual green with the naked eyes. In particular, beginners who are not skilled in golf have a lot of difficulty in grasping the putting distance and slope.

SUMMARY

The present disclosure has been devised to obviate the above limitation. A technical task of the present disclosure is directed to providing a golf putting data measurement device capable of being carried by a golfer without burden and enabling rapid measurement of golf putting data with simple manipulation.

The technical tasks of the present disclosure are not limited to those mentioned above, and other technical tasks not mentioned may be clearly understood by those skilled in the art from the following description.

According to an embodiment of the present disclosure, the golf putting data measurement device includes: a body to be coupled to a smartphone; a laser light source installed in the body that irradiates laser light to point to a subject when a measurement button of the body is pushed; a lidar sensor installed in the body that senses a distance to the subject pointed by the laser light source using a laser pulse; and a controller that computes golf putting data from distance information to the subject measured by the lidar sensor and transmits the golf putting data to the smartphone, and causes a display of the smartphone to display the golf putting data.

In addition, the body may be detachably installed on a rear surface of the smartphone.

In addition, the body may additionally be provided with a first coupling unit that is coupled or supported to one end of the smartphone. In addition, the body may be connected to a second coupling unit that is coupled or supported to the other end of the smartphone so as to be relatively movable with respect to the body.

In addition, the first coupling unit or the second coupling unit may be provided with a connector that is connected to a connection socket of the smartphone.

In addition, the body may be formed with a mount unit where the laser light source and the lidar sensor are installed.

In addition, the body may be equipped with a battery that may be charged by the power of the smartphone.

In addition, the controller may operate an acceleration sensor installed in the smartphone according to an input of the measurement button.

In addition, the distance information to the subject may include distance information from the lidar sensor to a golf ball; and distance information from the lidar sensor to a hole cup.

In addition, the controller may compute only putting distance information from a location of the golf ball to the hole cup in a first measurement mode, and compute a putting distance and green height information in a second measurement mode.

In addition, the golf putting data measurement device may further include an alarm unit that generates alarm information when an oriented direction of the lidar sensor is determined to be within a vertical range with respect to the ground.

In addition, the controller may acquire distance information from the lidar sensor to the hole cup and angle information at which the smartphone is lifted when the smartphone is lifted from a vertically erected location and a laser pointer irradiated from the laser light source reaches a location of the hole cup, and may compute the putting distance and the green height information from the distance information and the angle information.

In addition, the controller may be configured to stop an operation of the laser light source when an angle at which the smartphone is lifted is 90 degrees or more.

In addition, the smartphone may output putting advice information using the golf putting data and pre-stored putting environment information.

DETAILED DESCRIPTION

Figure 1:
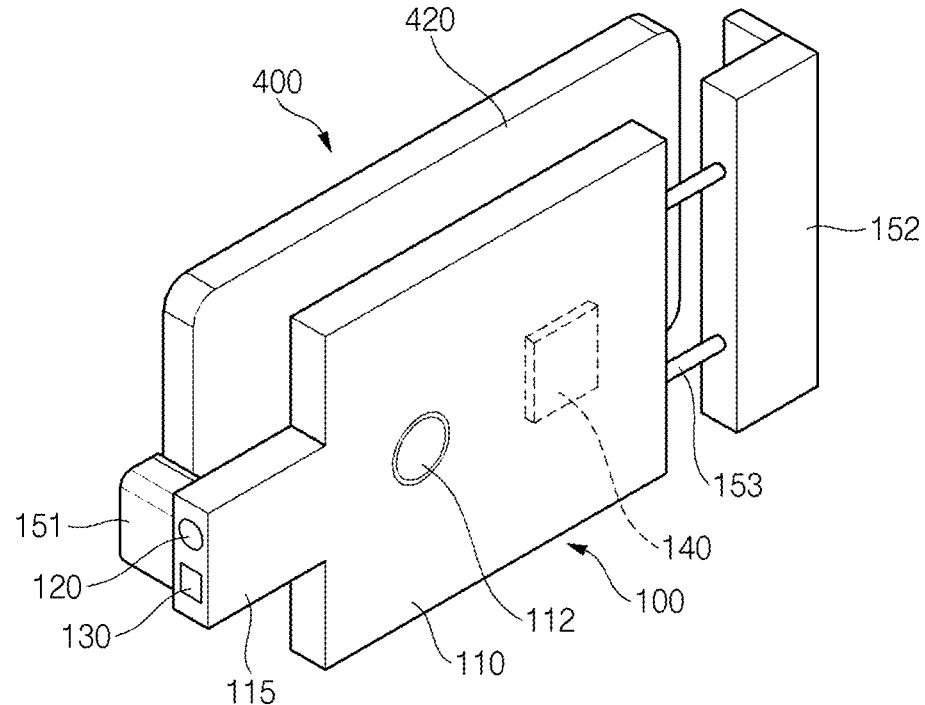
FIG. 1 is a perspective view of a golf putting data measurement device according to an embodiment of the present disclosure.

The present disclosure may be modified in various forms, and specific embodiments thereof will be illustrated in the drawings and described in detail in the detailed description. However, this is not intended to limit the present disclosure to specific embodiments, and it should be understood that all modifications, equivalents and substitutes included in the spirit and technical scope of the present disclosure are included. In describing the present disclosure, when it is determined that a detailed description of a related known technology may obscure the gist of the present disclosure, the detailed description thereof will be omitted.

Terms such as "first" and "second" may be used to describe various components, but the components are not restricted by the terms. The terms are used only to distinguish one component from another component.

The terms used herein are merely used to describe specific embodiments and are not intended to limit the present disclosure. The terms in singular form may include plural forms unless otherwise specified. It will be understood that the terms "comprising" or "having," when used herein, specify the presence of stated features, integers, steps, operations, elements, components, or combinations thereof, but do not preclude the presence or addition of one or more other features, integers, steps, operations, elements, components, and/or combinations thereof.

Hereinafter, an embodiment of a golf putting data measurement device according to an embodiment of the present disclosure will be described in detail with reference to the accompanying drawings. In the description with reference to the accompanying drawings, the same reference numerals are assigned to the same or corresponding components, and redundant descriptions thereof will be omitted.

FIG. 1 is a perspective view of a golf putting data measurement device according to an embodiment of the present disclosure.

As shown in FIG. 1, a golf putting data measurement device 100 according to an embodiment of the present disclosure includes a body 110, a laser light source 120, a LiDAR sensor 130, and a controller 140.

The body 110 forms an appearance of the golf putting data measurement device 100 and is configured to be coupled with a smartphone 400. The body 110 may be detachably installed on a rear surface 420 of the smartphone 400, and to this end, a first coupling unit 151 and a second coupling unit 152 may be provided on the body 110.

The first coupling unit 151 may be provided on the body 110 to be coupled or supported to one end of the smartphone 400, and in the case of an embodiment of the present disclosure, the first coupling unit 151 is exemplified as having the form of a support bar supported on an upper end of the smartphone 400.

The second coupling unit 152 is coupled or supported to the other end of the smartphone 400 and is connected to be relatively movable with respect to the body 110. According to an embodiment of the present disclosure, a connecting rod 153 is installed to be relatively movable on the body 110, and the second coupling unit 152 is configured to be connected to the connecting rod 153 to support the other end of the smartphone 400. Through this configuration, the body 110 may be coupled to various sizes of smartphones 400 regardless of the size of the smartphone 400.

The laser light source 120 is installed in the body 110, and when a measurement button 112 of the body 110 is pushed, the laser light is irradiated and points at a subject. The laser light source 120 may be configured to output green light at 1 mW that may ensure visibility even in broad daylight.

The lidar sensor 130 is installed in the body 110, and is configured to sense the distance to the subject pointed by the laser light source 120 using a laser pulse. The lidar sensor 130 irradiates the subject with a laser pulse and computes the distance to the subject by receiving the laser pulse reflected from the subject.

The laser light source 120 and the lidar sensor 130 may be installed in a mount unit 115 formed in the body 110. The mount unit 115 may have a shape that extends upward from the body 110, and the laser light source 120 and the lidar sensor 130 may be located on an upper surface of the mount unit 115. In this connection, the first coupling unit 151 may be installed on the mount unit 115.

The controller 140 is built into the body 110 and computes golf putting data from distance information to the subject measured through the lidar sensor 130. Then, the controller 140 transmits the golf putting data to the smartphone 400 so that a display 410 of the smartphone 400 displays the golf putting data.

Figure 2:
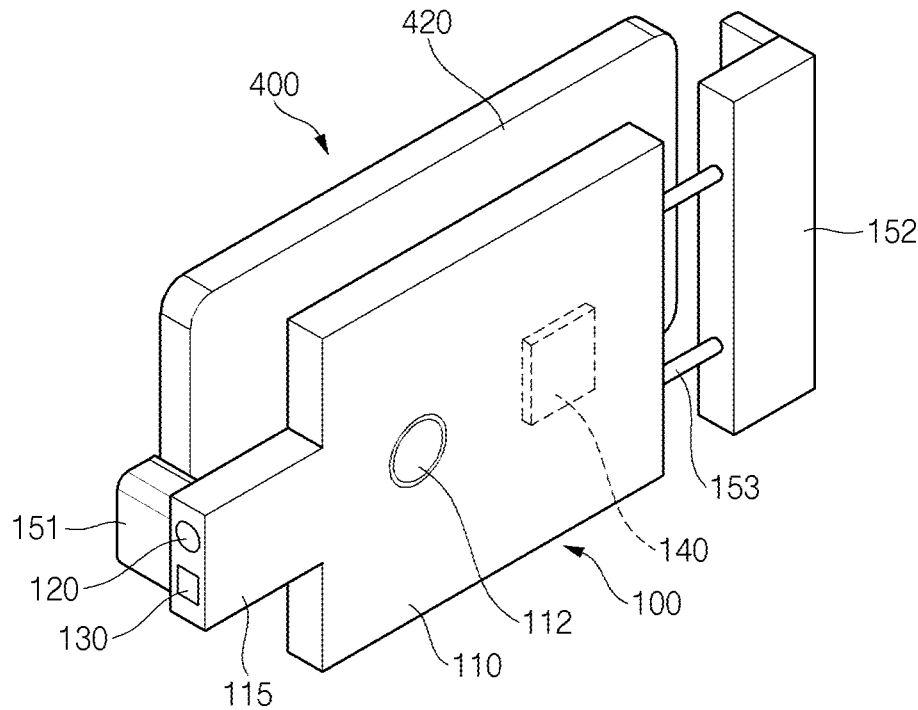
FIG. 2 is a diagram illustrating a process of coupling the golf data measurement device illustrated in FIG. 1 to a smartphone.
Figure 3:
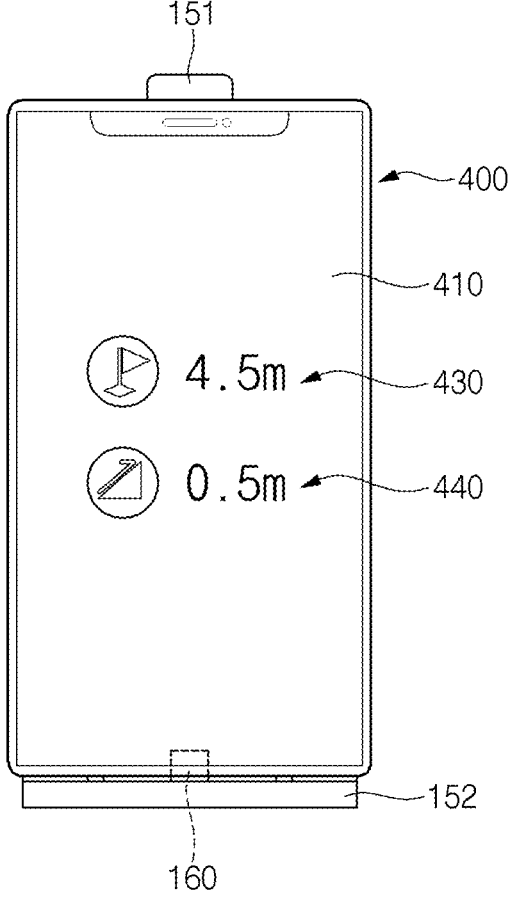
FIG. 3 is a diagram illustrating a state in which the golf data measurement device illustrated in FIG. 1 is coupled to a smartphone.

FIG. 2 is a diagram illustrating a process of coupling the golf data measurement device illustrated in FIG. 1 to a smartphone. FIG. 3 is a diagram illustrating a state in which the golf data measurement device illustrated in FIG. 1 is coupled to a smartphone.

Referring to FIG. 2, FIG. 2 shows a state in which one end of the smartphone 400 is supported by a first coupling unit 151 and the second coupling unit 152 is slidably moved. As illustrated in FIG. 2, the second coupling unit 152 may be provided with a connector 160 that is connected to a connection socket of the smartphone 400. Thus, the golf putting data measurement device 100 may transmit and receive data or send or receive power with the smartphone 400. The golf putting data measurement device 100 may be configured to be charged by the power of the smartphone 400 or operated by the power of the smartphone 400. To this end, a battery that may be charged by the power of the smartphone 400 may be built into the body 110.

As shown in FIG. 3, by moving the second coupling unit 152 to fix the smartphone 400 between the first coupling unit 151 and the second coupling unit 152, the connector 160 may be connected to the connection socket of the smartphone 400 to electrically connect the smartphone 400 and the golf putting data measurement device.

The golf putting data measurement device may transmit and receive data with the smartphone 400 through a wireless communication method such as Bluetooth in addition to the method of using the connector 160 as in an embodiment of the present disclosure.

FIG. 3 illustrates an example of the golf putting data being displayed on the display 410 of the smartphone 400, and the golf putting data may include putting distance information 430 from a location of a golf ball 200 to a hole cup 300 and green height information 440.

The golf putting data measurement device 100 may selectively compute and output the putting distance information 430 and the green height information 440 according to a measurement mode. The golf putting data measurement device 100 may be configured to output only the putting distance information 430 in a first measurement mode, and output the putting distance information 430 and the green height information 440 together in a second measurement mode, for example. In this connection, the selection of the measurement mode may be possible through an input member installed in the body 110 or a mode switching key displayed on the display 410 of the smartphone 400.

Figure 4:
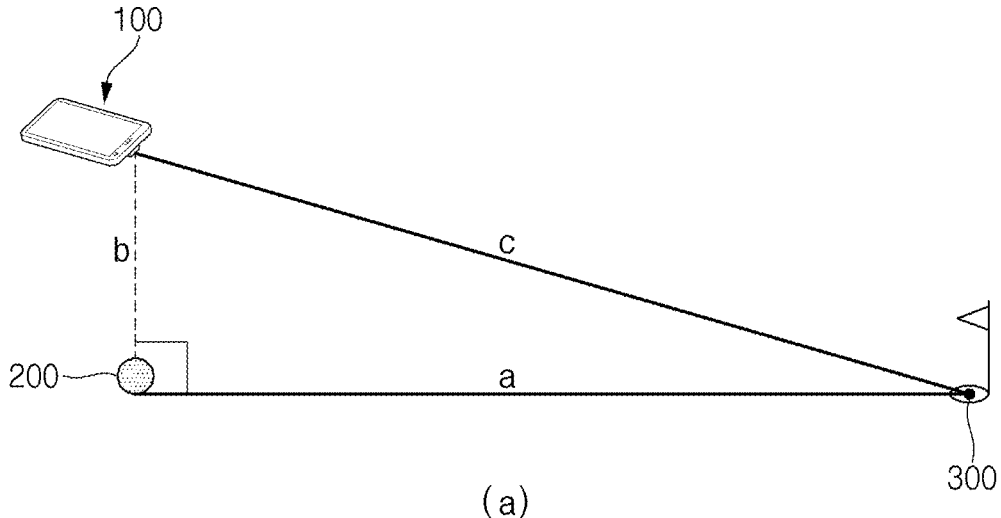
FIG. 4 is a diagram illustrating a geometric configuration for computing a putting distance and a green slope of a golf putting data measurement device according to an embodiment of the present disclosure.
Figure 4:
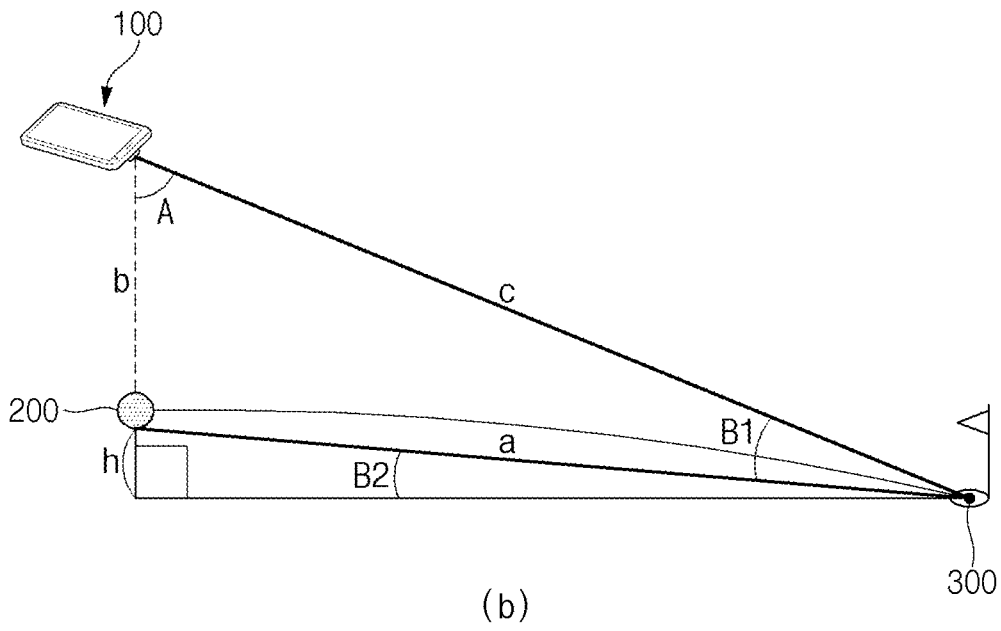

FIG. 4 is a diagram illustrating a geometric configuration for computing a putting distance and a green slope of a golf putting data measurement device according to an embodiment of the present disclosure.

FIG. 4(A) shows a time when the golf ball 200 and the hole cup 300 are at the same height on the green, and FIG. (B) shows a time when the hole cup 300 is at a location that is a certain height lower than the golf ball 200 on the green.

The distance information to the subject for computing the golf putting data may include distance information (b) from the lidar sensor 130 to the golf ball 200 and distance information (c) from the lidar sensor 130 to the hole cup 300. From the above two pieces of information, putting distance (a) may be computed from the geometric configuration shown in FIG. 4(A). The distance information from the lidar sensor 130 to the golf ball 200 may vary depending on the height of a user, and after measuring the corresponding information, the distance information may be stored in a storage member of the golf putting data measurement device 100 or the memory of the smartphone 400. In this connection, by measuring only the distance information (c) from the lidar sensor 130 to the hole cup 300, the putting distance information 430 may be quickly computed.

The golf putting data measurement device 100 may be set to output the putting distance information 430 in this manner when a user selects the first measurement mode (quick measurement mode).

In the case where there is a slope of the green as shown in FIG. 4(B), the accuracy of the measurement may be somewhat reduced in the manner above. In this connection, angle information (A) at which the smartphone 400 is lifted from the vertical position to the position corresponding to the hole cup 300 is additionally used.

In this regard, the golf putting data measurement device 100 may be provided with an alarm unit that provides alarm information (for example, vibration, sound, etc.) to a user, and the controller 140 may operate an acceleration sensor (for example, gyro sensor) built into the smartphone 400 according to the input of the measurement button 112.

The acceleration sensor senses that an oriented direction of the lidar sensor 130 or a direction in which the smartphone 400 is erected is within a vertical range with respect to the ground and transmits the corresponding information to the controller 140, and the controller 140 operates the alarm unit to generate the alarm information.

When the alarm information of the alarm unit is generated, a user presses the measurement button 112, and while pressing the measurement button 112, lifts the smartphone 400 or the measurement device from a state in which a laser pointer is located on the golf ball 200 so that the laser pointer moves. When the laser pointer moves along a putting line and reaches the position of the hole cup 300, the user releases the pressed state of the measurement button 112.

In this process, the controller 140 acquires the distance information (b) from the lidar sensor 130 to the golf ball 200, the distance information (c) from the lidar sensor 130 to the hole cup 300, and the angle information (A) at which the smartphone 400 is lifted from a vertically erected location to a location corresponding to the hole cup 300, thereby computing the putting distance information 430 indicating the putting distance (a) and the green height information 440 indicating green height (h). FIG. 4(B) shows a geometric configuration for computing the putting distance information 430 and the green height information 440.

The golf putting data measurement device 100 may be set to output the putting distance information 430 and the green height information 440 in the same manner when a user selects the second measurement mode (precision measurement mode).

When the angle at which the smartphone 400 is lifted is 90 degrees or more, the controller 140 may be configured to stop the operation of the laser light source 120. The controller 140 may receive sensing information from the acceleration sensor of the smartphone 400 and control the operation of the laser light source 120 based thereon. This is to prevent the risk of damage to the eyesight of golfers or caddies on the field, and galleries watching the game from being irradiated by laser light emitted from the laser light source 120.

Figure 5:
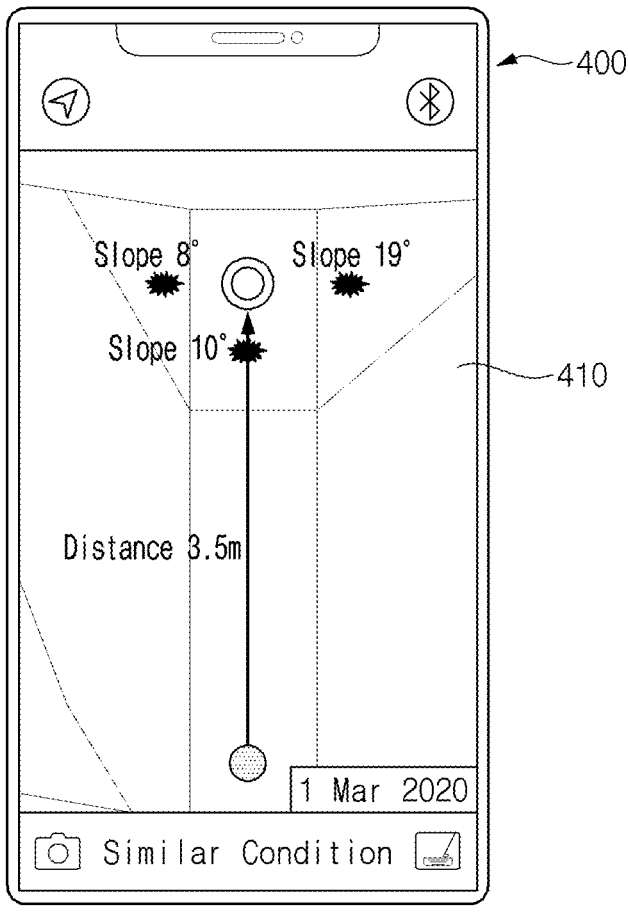
FIGS. 5 and 6 are diagrams illustrating examples of golf putting data output through a display of a smartphone.
Figure 6:
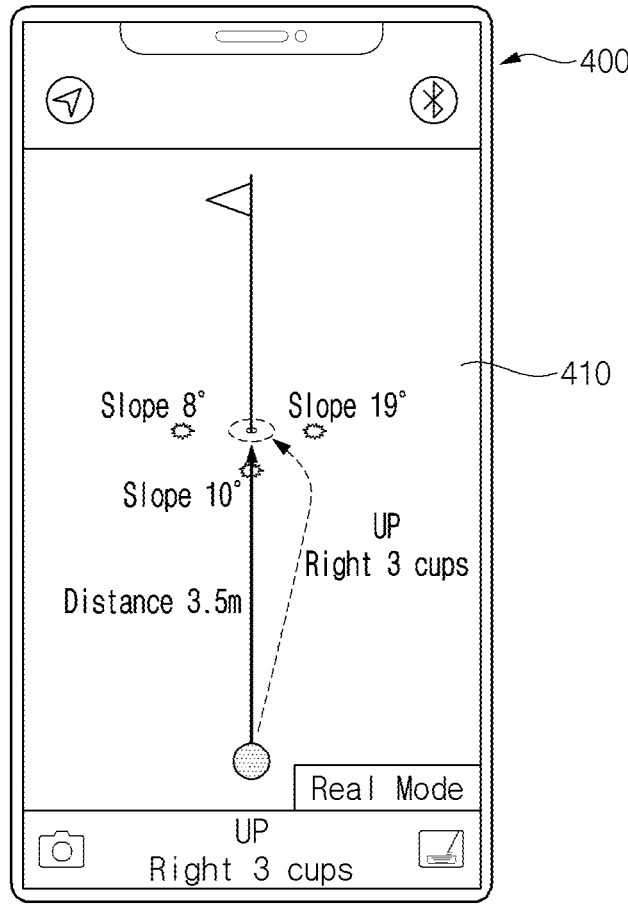

FIGS. 5 and 6 are diagrams illustrating examples of golf putting data output through the display 410 of the smartphone 400.

As shown in FIGS. 5 and 6, the smartphone 400 may be configured to output putting advice information using pre-stored putting environment information (for example, green slope information, green speed information, etc.) and golf putting data transmitted from the golf putting data measurement device 100. As the putting advice information, it is possible to provide putting distance, recommended putting trajectory, and slope information around the hole cup 300.

According to an embodiment of the present disclosure, the golf putting data measurement device is configured in a form that may be attached and detached to the smartphone, so that a golfer may carry the golf putting data measurement device without burden, and enables rapid measurement and output of the golf putting data with simple manipulation.

In addition, according to an embodiment of the present disclosure, by outputting the golf putting data through the display of the smartphone, it is possible to increase user readability and simplify a device configuration without needing to prepare a separate display for the golf putting data measurement device.

In addition, according to an embodiment of the present disclosure, since the golf putting data measurement device utilizes scientific and objective measurement using geometry rather than relying on subjective measurement using the human body such as the individual stride or eye measurement of a user, it is possible to provide suitable measurement data according to different physical conditions of each user.

In addition, according to an embodiment of the present disclosure, a quick measurement mode that measures only the putting distance and a precise measurement mode that measures the putting distance and the green height information may be selected according to the needs of a user.

In addition, according to an embodiment of the present disclosure, it is possible to provide various pieces of putting advice information to a user by utilizing the golf putting data measured by the golf putting data measurement device and the putting environment information of the green stored in the smartphone.

Although the present disclosure has been described above with reference to specific embodiments thereof, it will be understood by those skilled in the art that various modifications and changes may be made to the present disclosure without departing from the spirit and scope of the present disclosure as set forth in the claims below.

What is claimed is:

1. A golf putting data measurement device, comprising:
a body to be coupled to a smartphone;
a first coupling unit provided on the body and coupled or supported to one end of the smartphone; and
a second coupling unit that is coupled or supported to the other end of the smartphone and is movably connected relative to the body;
a laser light source installed in the body that irradiates laser light to point to a subject when a measurement button of the body is pushed;

a lidar sensor installed in the body that senses a distance to the subject pointed by the laser light source using a laser pulse; and a controller that computes golf putting data from distance information to the subject measured by the lidar sensor and transmits the golf putting data to the smartphone, and causes a display of the smartphone to display the golf putting data, wherein the first coupling unit or the second coupling unit are provided with a connector that is connected to a connection socket of the smartphone.

2. The device of claim 1, wherein the body is detachably installed on a rear surface of the smartphone.

3. The device of claim 1, wherein the body is formed with a mount unit where the laser light source and the lidar sensor are installed.

4. The device of claim 1, wherein the body is equipped with a battery capable of being charged by the power of the smartphone.

5. The device of claim 1, wherein the controller operates an acceleration sensor installed in the smartphone according to an input of the measurement button.

6. The device of claim 1, wherein the distance information to the subject comprises distance information from the lidar sensor to a golf ball and distance information from the lidar sensor to a hole cup.

7. The device of claim 1, wherein the controller computes only putting distance information from a location of a golf ball to a hole cup in a first measurement mode, and computes a putting distance and green height information in a second measurement mode.

8. The device of claim 1, further comprising an alarm unit that generates alarm information when an oriented direction of the lidar sensor is determined to be within a vertical range with respect to the ground.

9. The device of claim 8, wherein the controller acquires distance information from the lidar sensor to a hole cup and angle information at which the smartphone is lifted when the smartphone is lifted from a vertically erected location and a laser pointer irradiated from the laser light source reaches a location of the hole cup, and computes a putting distance and green height information from the distance information and the angle information.

10. The device of claim 9, wherein the controller stops an operation of the laser light source when an angle at which the smartphone is lifted is 90 degrees or more.

11. The device of claim 1, wherein the smartphone output putting advice information using the golf putting data and pre-stored putting environment information.

* * * * *